Dec. 3, 1929.                    W. DUBILIER                    1,738,175
                        ADJUSTABLE VACUUM CONDENSER
                            Filed Sept. 3, 1924
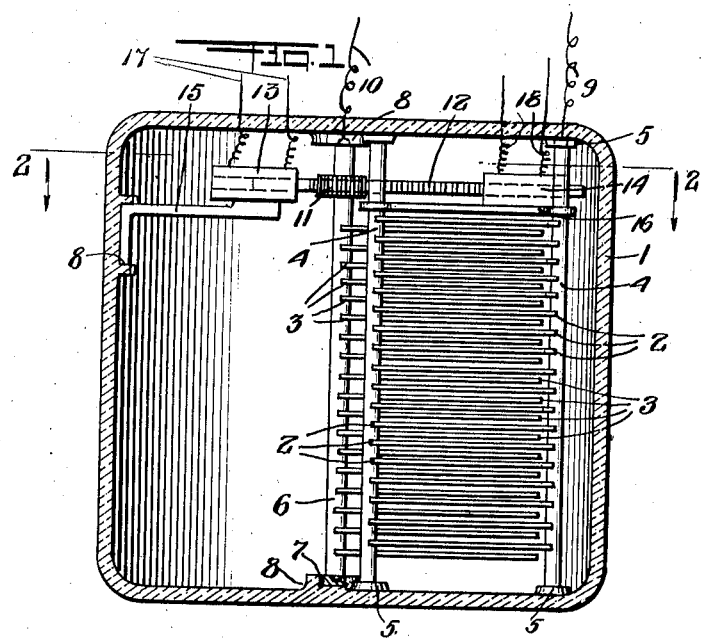
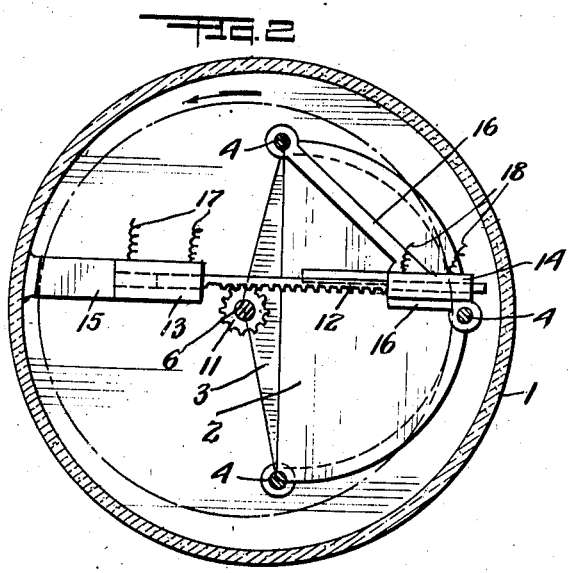
INVENTOR
WILLIAM DUBILIER
BY
ATTORNEY Patented Dec. 3, 1929

1,738,175

UNITED STATES PATENT OFFICE

WILLIAM DUBILIER, OF NEW YORK, N. Y., ASSIGNOR TO DUBILIER CONDENSER CORPORATION, OF NEW YORK, N. Y., A CORPORATION OF DELAWARE

ADJUSTABLE VACUUM CONDENSER

Application filed September 3, 1924. Serial No. 735,565.

My invention relates to improvements in electrical condensers, especially electrical condensers designed to enable the capacity thereof to be adjusted.

An object of my invention is to provide an adjustable condenser adapted to be operated at higher voltages and with smaller losses than have heretofore been deemed attainable; this object being gained, for example, by mounting the condenser in a completely evacuated vessel, thus dispensing with the dielectric material which has been present in every previous condenser, between the conductive elements which receive the electrical charge from the circuit in which the condenser is connected; and avoiding the losses and other drawbacks which the use of dielectric material always entails; the adjustable condenser further being mounted within the evacuated vessel in such a way that the movable elements of the condenser can be actuated in a simple and efficient manner to change the capacity of the condenser without in any way disturbing the physical conditions inside said vessel, the parts which actuate the movable elements being nearly all located on the interior of said vessel and only a few of said parts, and those fixed, extending through said vessel to the exterior thereof.

Other objects and advantages of this invention will be set forth in the following description taken with the drawing which show one embodiment of my invention. The characteristics of my improvements are pointed out in the claims. But, while I show only one form of condenser on the drawings, I, of course, reserve the right to make changes as the shape, size and arrangement of parts, within the limits of the scope and spirit of the invention, as the appended claims define same.

On the drawings, Figure 1 is a longitudinal section of a condenser according to my invention; and Figure 2 is a section on line 2—2 of Figure 1.

On the drawings, the same numerals identify the same parts throughout.

I show at 1, an evacuated vessel such as a bulb 1 of glass or other suitable material from which the air has been exhausted, so as to leave a vacuum on the interior of the same, and within the space or chamber enclosed by this vessel, I mount a plurality of elements of conductive material 2 supported in fixed position and separated by intervening spaces in which are other elements of conductive material 3 arranged to be moved so that a greater or smaller portion of the surface area of the elements 3 may be in close proximity to the surface area of the elements 2, in order to permit adjustment of the capacity of the condenser as required. The elements 2 may have any suitable shape or outline, but are shown as substantially semi-circular, and supported by being attached to rods 4, the ends of which are fixed inside the vessel 1 and held in rigid position by means of bearings or sockets 5 which may be formed in any convenient fashion. The elements 3 may be similar in shape to the elements 2 and be affixed at their midpoints along one edge to a shaft or spindle 6 parallel to the rods or posts 4 and mounted so that it can rotate to move the elements 3. The ends of the shaft 6 are received in bearings 7 of any substance which will answer the purpose, held fast in sockets 8 inside of the vessel 1, and the elements 2 may be joined to an outside circuit by embedding in the vessel 1 the end of a conductor 9 attached to one of the posts 4 which, of course, must be of metal; while the movable elements 3 may be joined to the opposite terminal of the circuit by making the shaft 6 and bearing members 7 of conductive material, and joining to one of these members 7 the end of a conductor 8 which is embedded in the vessel 1 and projects through the same. Hence, no matter what may be the position to which the shaft 6 and elements 3 are turned, to increase or decrease the capacity of the condenser, the elements 2 and 3 can always be maintained in connection with the opposite terminals of the circuit.

To adjust the elements 3, I mount on the shaft 6 adjacent one end thereof, a pinion 11 which is in mesh with a reciprocable part or rack bar 12, this rack bar to be of some magnetic material. Adjacent the opposite ends of this rack bar and in line therewith, I dispose a pair of solenoids 13 and 14, and one of these coils 13 may be mounted upon a bracket 15 secured in a socket 8 at one side of the vessel 1, and on the interior thereof; and the other coil 14 may be mounted upon a bar or plate 16 made fast at its opposite ends to two of the posts 4 as indicated more plainly in Figure 2. The two coils 13 and 14 may be held upon the supports 15 and 16 in any suitable way and to the coil 13 will be led a pair of conductors 17 from the exterior to the interior of the vessel 1, these conductors being sealed in the vessel; while similarly from the outside of the vessel, a pair of conductors 18 extend to the interior of the vessel 1, and to the coil 14, and are sealed in the wall of this vessel. Hence, whenever a source of electrical energy is connected to the conductor 17, the coil 13 will be energized to draw the rack bar 12 into same and turn the shaft 6 in one direction; and similarly to move the bar 12 and turn the shaft 6 in the opposite direction, it is only necessary to energize the coil 14. Thus, the elements 3 may be caused to assume any desired position with respect to the elements 2, and any capacity within the range of the condenser can be secured. At the same time, the vacuum inside of the vessel 1 remains perfect because there is no communication between the interior of the vessel and the exterior, and the conductors 17 and 18 are sealed tight at the points where they pass into the vessel 1. Of course, instead of two coils 13 and 14, I may use means comprising a single coil to pull the rack bar 12 in one direction, and a spring to pull the rack bar in the other direction.

It is to be understood that the bar 12 being movable in one direction by the pull of the coil 13; and in the opposite direction by the pull of the coil 14, may be displaced to a greater or less extent simply by controlling the current through these coils. For example, if the current through the coil 13 is adjusted to be stronger than the current through the coil 14, the bar 12 can be moved to the left slowly, and the pull of the coil 14 only retard the movement of the bar 12. When the bar has moved to the required extent, the current through both coils can be interrupted and then the movable plates of the condenser will remain in the position given them, so long as the shaft 6 is in vertical position, because the parts will then remain motionless by their own inertia.

But in any event, the operating parts for moving the elements 3 and comprising the bar or plunger 12, the pinion 11 and the solenoids 13 and 14, are all disposed inside of the vessel 1, and the only parts which extend through the vessel 1 to the outside are the parts for enabling the solenoids to be energized, that is, the fixed conductors 17 and 18, and thus the operation of the condenser by means of the solenoids does not in any way lessen or disturb the vacuum on the interior of the vessel 1.

Such a condenser mounted in a vacuum can be operated at higher voltages than otherwise would be permitted. The vacuum leaves nothing adjacent the elements of conductive material to be ionized by the electricity, and no current, therefore, can flow from the elements of one polarity to the elements of opposite polarity. All brush discharges and other losses are nullified; and when no insulation between the elements or plates 2 and 3 is employed, there are no current or voltage losses which the presence of dielectric always produces. In fact, the only losses which occur are those due to eddy currents and these can be greatly reduced by making the metal plates 2 and 3 and the other metal parts of the condenser as small and as thin as possible. While I can entirely dispense with the presence of dielectric in the spaces between the plates 2 and 3, and with the plates 2 and 3 simply separated from one another in the vacuum inside the vessel 1, no solid liquid or gaseous dielectric is present. I can, if desired, in some instances, utilize sheets of dielectric in combination with the opposite faces of the elements 2 and 3, and in such instances, while some losses besides the eddy current losses may take place, I still eliminate brush discharges and corona losses and enable the condenser to be operated with the same relatively high voltages as when no dielectric is included. At the same time, any adjustment can be readily obtained within the full range of the capacity of the condenser.

Of course, the particular type of condenser is not material to this invention, as I may vary the design of condenser widely and still be within the principle of this invention.

Having described my invention, what I believe to be new and desire to secure and protect by Letters Patent of the United States is:—

1. The combination of an evacuated vessel, elements of conductive material therein, part of said elements being movable, a shaft on which said movable elements are mounted, means comprising a rack and pinion for rotating the shaft to adjust the condenser, and a pair of solenoids for reciprocating the rack, the shaft, the rack and pinion, and the solenoids, all being enclosed by said vessel, the terminals of said coil being joined to conductors which are sealed in the vessel and extend through said vessel to the exterior thereof.

2. The combination of an evacuated vessel, an adjustable condenser therein, said condenser comprising a plurality of fixed electrically conductive elements, and a plurality of movable electrically conductive elements to co-operate with said fixed elements, a shaft on which said movable elements are mounted, a pinion and a rack to rotate the shaft, means comprising a solenoid to reciprocate the rack, the shaft, the rack, and pinion, and said means, all being enclosed by said vessel and conductors for leading current to said solenoid extending from the inside to the outside of the vessel and sealed therein.

3. The combination of an evacuated vessel, an adjustable condenser in said vessel, said condenser comprising parallel posts inside of said vessel and affixed thereto, elements of conductive material supported by said posts, movable elements of conductive material to co-operate with the first-named elements, a rotatable shaft to which the movable elements are secured, said shaft having its ends engaging bearings in said vessel, a pinion carried by said shaft, a rack bar engaging the pinion, a solenoid carried adjacent said posts to move the rack bar in one direction, and another solenoid supported in said casing to move the rack bar in the opposite direction, whereby the shaft can be rotated to actuate the movable condenser elements and vary the capacity of the condenser.

Signed at New York in the county of New York and State of New York this 27th day of August A. D. 1924.

WILLIAM DUBILIER.